(12) United States Patent
Mishelevich et al.

(10) Patent No.: US 6,434,547 B1
(45) Date of Patent: Aug. 13, 2002

(54) DATA CAPTURE AND VERIFICATION SYSTEM

(75) Inventors: David J. Mishelevich, Cupertino; Ted W. Lanpher, Half Moon Bay, both of CA (US)

(73) Assignee: Qenm.com, Half Moon Bay, CA (US)

( * ) Notice: Subject to any disclaimer, the term of this patent is extended or adjusted under 35 U.S.C. 154(b) by 0 days.

(21) Appl. No.: 09/429,746

(22) Filed: Oct. 28, 1999

(51) Int. Cl.[7] .............................................. G06F 17/30
(52) U.S. Cl. ...................................................... 707/3
(58) Field of Search ..................... 707/507, 3; 704/235, 704/270, 278

(56) References Cited

U.S. PATENT DOCUMENTS

| | | | |
|---|---|---|---|
| 4,582,441 A | 4/1986 | Carter et al. ................ 707/504 |
| 4,674,065 A | 6/1987 | Lange et al. ................ 382/311 |
| 4,829,576 A | 5/1989 | Porter ......................... 704/235 |
| 4,914,704 A | 4/1990 | Cole et al. ................... 704/235 |
| 4,945,475 A | * 7/1990 | Bruffey et al. .............. 707/533 |
| 5,031,113 A | 7/1991 | Hollerbauer ................ 704/235 |
| 5,040,132 A | 8/1991 | Schuricht et al. ........... 400/712 |
| 5,465,378 A | 11/1995 | Duensing et al. ........... 707/529 |
| 5,519,808 A | 5/1996 | Benton, Jr. et al. ......... 704/270 |
| 5,524,169 A | 6/1996 | Cohen et al. ................ 704/231 |
| 5,572,625 A | 11/1996 | Raman et al. ................. 704/60 |
| 5,576,955 A | 11/1996 | Newbold et al. ............ 707/533 |
| 5,600,756 A | 2/1997 | Ely .............................. 704/235 |
| 5,649,060 A | 7/1997 | Ellozy et al. ................ 704/278 |
| 5,669,007 A | 9/1997 | Tateishi ....................... 707/517 |
| 5,682,541 A | 10/1997 | Martin ........................ 707/507 |
| 5,689,585 A | 11/1997 | Bloomberg et al. ......... 382/229 |
| 5,704,371 A | 1/1998 | Shepard ...................... 128/897 |
| 5,712,957 A | 1/1998 | Waibel et al. ............... 704/240 |
| 5,731,991 A | * 3/1998 | Kinra et al. ................. 702/186 |
| 5,745,873 A | 4/1998 | Braida et al. ................ 704/222 |
| 5,761,641 A | 6/1998 | Rozak et al. ................ 704/275 |
| 5,799,273 A | 8/1998 | Mitchell et al. ............. 704/235 |
| 5,805,159 A | 9/1998 | Bertram et al. ............. 345/764 |
| 5,809,476 A | 9/1998 | Ryan ............................. 705/2 |
| 5,818,423 A | 10/1998 | Pugliese et al. ............. 345/157 |
| 5,855,000 A | 12/1998 | Waibel et al. ............... 704/235 |
| 5,857,099 A | * 1/1999 | Mitchell et al. ............. 704/235 |
| 5,873,061 A | 2/1999 | Hab-Umbach et al. ..... 704/254 |
| 5,875,429 A | 2/1999 | Douglas ...................... 704/275 |
| 5,875,448 A | 2/1999 | Boys et al. .................. 707/531 |
| 5,890,122 A | 3/1999 | Van Kleeck et al. ........ 704/275 |
| 5,890,123 A | 3/1999 | Brown et al. ................ 704/275 |
| 5,895,447 A | 4/1999 | Ittycheriah et al. ......... 704/231 |
| 5,903,867 A | 5/1999 | Watari et al. ................ 704/270 |
| 5,909,667 A | 6/1999 | Leontiades et al. ......... 704/205 |
| 5,918,222 A | 6/1999 | Fukui et al. .................... 704/1 |
| 5,920,835 A | 7/1999 | Huzenlaub et al. ......... 704/235 |
| 5,920,837 A | 7/1999 | Gould et al. ................ 704/251 |
| 5,920,841 A | 7/1999 | Schottmuller et al. ...... 345/157 |
| 5,933,807 A | 8/1999 | Fukuzawa ................... 704/275 |
| 5,970,460 A | * 10/1999 | Bunce et al. ................ 704/278 |
| 6,047,257 A | * 4/2000 | Dewaele ..................... 704/270 |

OTHER PUBLICATIONS

Sunkpho et al., MIA: A Wearable Computer For Bridge Inspectors;Wearable Computers, Second International Symposium on, Oct. 19–20, 1998, pp. 160–161.*

* cited by examiner

Primary Examiner—Diane D. Mizrahi
(74) Attorney, Agent, or Firm—Arter & Hadden LLP

(57) ABSTRACT

A method and system for capturing data and verifying the data accuracy, includes a structured document having defined regions dealing with different categories. Dictionaries specific to the categories are included to check the accuracy. of words and phrases in the various regions. Points are allocated to the entered data to facilitate subsequent decision making, and a facility is provided to maximize the accumulation of points by visually indicating regions that could potentially be filled in to increase points most effectively. Preferably data is entered orally by a user into a computer system, and transcribed using speech-recognition software. The user is prompted for data entry, and the prompting mechanism may follow a predefined pattern and speed, or be adjustable by the user, or be adjusted by the computer by monitoring past user behavior.

63 Claims, 13 Drawing Sheets

FIG. 5

| Key | PatientId | EncounterId | Enco | Element | OrdinalF | Comple | Category | AssocPro | DisplayName | ElementCollecti |
|---|---|---|---|---|---|---|---|---|---|---|
| 111111 | 200-38-1001 | 09-15-99 | X | PROB | 6 | | Base | Table6 | Problems | 111111 |
| 111111 | NoPatientId | NoEncounterId | X | PROB | 6 | | Base | Table6 | Problems | 111111 |
| 598.0 | 200-38-1001 | 09-15-99 | X | PROB | 6 | 0 | Urology | Active | Problems | 598.0 |
| 598.0 | NoPatientId | NoEncounterId | X | PROB | 6 | 0 | Urology | Active | Problems | 598.0 |
| 944444 | 200-38-1001 | 09-15-99 | X | PROB | 6 | 0 | Urology | Table6 | Problems | 944444 |
| 944444 | NoPatientId | NoEncounterId | X | PROB | 6 | 0 | Urology | Table6 | Problems | 944444 |
| 999888 | 200-38-1001 | 09-15-99 | X | PROB | 6 | 0 | Urology | Table0 | Problems | 999888 |
| 999888 | NoPatientId | NoEncounterId | X | PROB | 6 | 0 | Urology | Table0 | Problems | 999888 |
| Hytrin | NoPatientId | NoEncounterId | X | MDM | 1 | 1 | Urology-Smith | None | MDM-Hytrin | MDM-Hytrin |
| Key1 | 200-38-1001 | 09-15-99 | X | HPI | 1 | | Base | Table1 | HPI | HPIllness |
| Key1 | NoPatientId | NoEncounterId | X | HPI | 1 | | Base | Table1 | HPI | HPIllness |
| Key2 | 200-38-1001 | 09-15-99 | X | ROS | 2 | | Base | Table2 | ROS | ROSystems |
| Key2 | NoPatientId | NoEncounterId | X | ROS | 2 | | Base | Table2 | ROS | ROSystems |
| Key3 | 200-38-1001 | 09-15-99 | X | PFSH | 3 | | Base | Table3 | PFSH | PFSHistory |
| Key3 | NoPatientId | NoEncounterId | X | PFSH | 3 | | Base | Table3 | PFSH | PFSHistory |
| Key4 | 200-38-1001 | 09-15-99 | X | PE | 4 | | Base | Table4 | Physical Examinatio | Pexamination |
| Key4 | NoPatientId | NoEncounterId | X | PE | 4 | | Base | Table4 | Physical Examinatio | Pexamination |
| Key5 | 200-38-1001 | 09-15-99 | X | MACRO | 5 | 0 | Base | Table5 | Macros | MacroSet |
| Key5 | NoPatientId | NoEncounterId | X | MACRO | 5 | 0 | Base | Table5 | Macros | MacroSet |
| Key6 | 200-38-1001 | 09-15-99 | X | CC | 0 | 0 | Base | Table6 | Chief Complaint | ChiefComplaints |
| Key6 | NoPatientId | NoEncounterId | X | CC | 0 | 0 | Base | Table6 | Chief Complaint | ChiefComplaints |
| Key7 | 200-38-1001 | 09-15-99 | X | MDM | 1 | 1 | Base | None | Prescription | MDM-RX |
| Key7 | NoPatientId | NoEncounterId | X | MDM | 1 | 1 | Base | None | Prescription | MDM-RX |
| PREESWL | NoPatientId | NoEncounterId | X | MACRO | 1 | 1 | Urology-Smith | None | PREESWL | PREESWL |

| Key | PatientId | ParentCo | EncounterId | Enc | Eleme | Ordi | Comp | Catego |
|---|---|---|---|---|---|---|---|---|
| CC1 | 200-38-1001 | ChiefCompl | 09-15-99 | X | CC | 1 | 0 | Base |
| CC1 | NoPatientId | ChiefCompl | NoEncounterId | X | CC | 1 | 0 | Base |
| PREESWL_01 | NoPatientId | PREESWL | NoEncounterId | X | HPI | 1 | 2 | Base |
| PREESWL_02 | NoPatientId | PREESWL | NoEncounterId | X | PFSH | 0 | 2 | Urology |
| PREESWL_03 | NoPatientId | PREESWL | NoEncounterId | X | PFSH | 1 | 2 | Urology |
| PREESWL_04 | NoPatientId | PREESWL | NoEncounterId | X | ROS | 1 | 2 | Urology |
| PREESWL_05 | NoPatientId | PREESWL | NoEncounterId | X | PE | 1 | 2 | Urology |
| PREESWL_06 | NoPatientId | PREESWL | NoEncounterId | X | PE | 2 | 2 | Urology |
| PREESWL_07 | NoPatientId | PREESWL | NoEncounterId | X | PE | 3 | 2 | Urology |
| PREESWL_08 | NoPatientId | PREESWL | NoEncounterId | X | PE | 4 | 2 | Urology |
| PREESWL_09 | NoPatientId | PREESWL | NoEncounterId | X | MDM | 1 | 2 | Urology |
| PREESWL_10 | NoPatientId | PREESWL | NoEncounterId | X | MDM | 2 | 2 | Urology |

FIG. 6A

| FIG. 6 | |
|---|---|
| FIG. 6A | FIG. 6B |
| FIG. 6C | FIG. 6D |

| DisplayName | Comple | Subsc | InternalC | Recorde | ValueT | DataValue |
|---|---|---|---|---|---|---|
| Chief Complaint | ☐ | 0 | None | Smith | Text | |
| Chief Complaint | ☐ | 0 | None | | Text | |
| HPI-General | ☑ | 1 | None | | Memo | The patient c- |
| Past History | ☑ | 1 | None | | Memo | The patient's |
| Family History | ☑ | 1 | None | | Memo | The patient's |
| ROS | ☑ | 1 | None | Smith | Memo | The patient's |
| PE-General | ☑ | 2 | None | Smith | Memo | General exam |
| PE-HEENT | ☑ | 2 | None | Smith | Memo | No clinical ab |
| PE-Chest | ☑ | 1 | None | Smith | Memo | Heart/Lungs: |
| PE-Abdomen | ☑ | 1 | None | Smith | Memo | Soft; no mas |
| Lab and X-Ray | ☑ | 1 | None | Smith | Memo | Review of the |
| Disposition | ☑ | 1 | None | Smith | Memo | I went over th |

FIG. 6B

| Key | PatientId | ParentCo | EncounterId | Enc | Eleme | Ordi | Comp | Catego |
|---|---|---|---|---|---|---|---|---|
| HPI1 | 200-38-1001 | HPIllness | 09-15-99 | X | HPI | 1 | | Base |
| HPI1 | NoPatientId | HPIllness | NoEncounterId | X | HPI | 1 | | Base |
| HPI2 | 200-38-1001 | HPIllness | 09-15-99 | X | HPI | 2 | | Base |
| HPI2 | NoPatientId | HPIllness | NoEncounterId | X | HPI | 2 | | Base |
| HPI3 | 200-38-1001 | HPIllness | 09-15-99 | X | HPI | 3 | | Base |
| HPI3 | NoPatientId | HPIllness | NoEncounterId | X | HPI | 3 | | Base |
| HPI4 | 200-38-1001 | HPIllness | 09-15-99 | X | HPI | 4 | | Base |
| HPI4 | NoPatientId | HPIllness | NoEncounterId | X | HPI | 4 | | Base |
| HPI5 | 200-38-1001 | HPIllness | 09-15-99 | X | HPI | 5 | | Base |
| HPI5 | NoPatientId | HPIllness | NoEncounterId | X | HPI | 5 | | Base |
| HPI6 | 200-38-1001 | HPIllness | 09-15-99 | X | HPI | 6 | | Base |
| HPI6 | NoPatientId | HPIllness | NoEncounterId | X | HPI | 6 | | Base |
| HPI7 | 200-38-1001 | HPIllness | 09-15-99 | X | HPI | 7 | | Base |
| HPI7 | NoPatientId | HPIllness | NoEncounterId | X | HPI | 7 | | Base |
| HPI8 | 200-38-1001 | HPIllness | 09-15-99 | X | HPI | 8 | | Base |
| HPI8 | NoPatientId | HPIllness | NoEncounterId | X | HPI | 8 | | Base |
| InitialPos | 200-38-1001 | 111111 | 09-15-99 | X | PROB | 1 | | Base |
| InitialPos | 200-38-1001 | 598.0 | 09-15-99 | X | PROB | 1 | 0 | Urology |
| InitialPos | 200-38-1001 | 944444 | 09-15-99 | X | PROB | 1 | 0 | Urology |
| InitialPos | 200-38-1001 | 999888 | 09-15-99 | X | PROB | 1 | 0 | Urology |

FIG. 6C

| DisplayName | Complete | Subsc | InternalC | Recorder | ValueT | DataValue |
|---|---|---|---|---|---|---|
| Location | ☐ | 0 | None | Smith | Text | |
| Location | ☐ | 0 | None | Smith | Text | |
| Pain Quality | ☐ | 0 | None | Smith | Text | |
| Pain Quality | ☐ | 0 | None | Smith | Text | |
| Pain Severity | ☐ | 0 | None | Smith | Text | |
| Pain Severity | ☐ | 0 | None | Smith | Text | |
| Pain Timing | ☐ | 0 | None | Smith | Text | |
| Pain Timing | ☐ | 0 | None | Smith | Text | |
| Duration | ☐ | 0 | None | Smith | Text | |
| Duration | ☐ | 0 | None | Smith | Text | |
| Context | ☐ | 0 | None | Smith | Text | |
| Context | ☐ | 0 | None | Smith | Text | |
| Modifying Factors | ☐ | 0 | None | Smith | Text | |
| Modifying Factors | ☐ | 0 | None | Smith | Text | |
| Associated Signs ar | ☐ | 0 | None | Smith | Text | |
| Associated Signs ar | ☐ | 0 | None | Smith | Text | |
| Initial Position | ☐ | 0 | 111111 | Smith | Number | 0 |
| Initial Position | ☐ | 0 | 598.0 | Smith | Number | 0 |
| Initial Position | ☐ | 0 | 944444 | Smith | Number | 0 |
| Initial Position | ☐ | 0 | 999888 | Smith | Number | 0 |

FIG. 6D

Elements{Key{Key6}EncounterId{Base}ElementType{CC}AssocProblem{Table6}DisplayName{Chief Complaint}
  Element{Key{CC1}EncounterId{Base}ElementType{CC}DisplayName{Chief Complaint}Complete{False}ValueType{Text}Value{Not Specified}}}
Elements{Key{Key1}EncounterId{Base}ElementType{HPI}AssocProblem{Table1}DisplayName{HPI}
  Element{Key{HPI1}EncounterId{Base}ElementType{HPI}DisplayName{Location}Complete{False}ValueType{Text}Value{Not Specified}}
  Element{Key{HPI2}EncounterId{Base}ElementType{HPI}DisplayName{Pain Quality}Complete{False}ValueType{Text}Value{Not Specified}}
  Element{Key{HPI3}EncounterId{Base}ElementType{HPI}DisplayName{Pain Severity}Complete{False}ValueType{Text}Value{Not Specified}}
  Element{Key{HPI4}EncounterId{Base}ElementType{HPI}DisplayName{Pain Timing}Complete{False}ValueType{Text}Value{Not Specified}}
  Element{Key{HPI5}EncounterId{Base}ElementType{HPI}DisplayName{Duration}Complete{False}ValueType{Text}Value{Not Specified}}
  Element{Key{HPI6}EncounterId{Base}ElementType{HPI}DisplayName{Context}Complete{False}ValueType{Text}Value{Not Specified}}
  Element{Key{HPI7}EncounterId{Base}ElementType{HPI}DisplayName{Modifying Factors}Complete{False}ValueType{Text}Value{Not Specified}}
  Element{Key{HPI8}EncounterId{Base}ElementType{HPI}DisplayName{Associated Signs and Symptoms}Complete{False}ValueType{Text}Value{Not Specified}}}
Elements{Key{Key5}EncounterId{Base}ElementType{MACRO}AssocProblem{Table5}DisplayName{Macros}
  Element{Key{MC1}EncounterId{Base}ElementType{MACRO}DisplayName{pick one}Complete{False}ValueType{Text}Value{Patient reports normal good health and comes in for a routine review and physical examination.}}
  Element{Key{MC2}}EncounterId{Base}ElementType{MACRO}DisplayName{pick two}Complete{False}ValueType{Text}Value{Patient has recovered and comes in for a follow-up examination.}}}
Elements{Key{Key4}EncounterId{Base}ElementType{PE}AssocProblem{Table4}DisplayName{Physicical Examination}
  Element{Key{PE1-VS}EncounterId{Base}ElementType{PE}DisplayName{Vital Signs, BP-E; BP-S; P; R; T; H; W}Complete{False}ValueType{Text}Value{Not Specified}}
  Element{Key{PE2-GenApp}EncounterId{Base}ElementType{PE}DisplayName{General Appearance}Complete{False}ValueType{Text}Value{Not Specified}}
  Element{Key{PE3-Eyes}EncounterId{Base}ElementType{PE}DisplayName{Eyes; Conj/Lids; Pupils/Irises; Optic Discs/Posterior Segs}Complete{False}ValueType{Text}Value{Not Specified}}
  Element{Key{PE4-ENMT}EncounterId{Base}ElementType{PE}DisplayName{ENMT; Ears/Nose; Hearing; Lips/Teeth/Gums; Otoscope; Nasal Mucosa/Septum/Turbinates; Oropharynx/Post Pharynx}Complete{False}ValueType{Text}Value{Not Specified}}}
Elements{Key{Key3}EncounterId{Base}ElementType{PFSH}AssocProblem{Table3}DisplayName{PFSH}
  Element{Key{PH1}EncounterId{Base}ElementType{PFSH}DisplayName{Past History}Complete{False}ValueType{Text}Value{Not Specified}}
  Element{Key{PH2}EncounterId{Base}ElementType{PFSH}DisplayName{Family History}Complete{False}ValueType{Text}Value{Not Specified}}
  Element{Key{PH3}EncounterId{Base}ElementType{PFSH}DisplayName{Social History}Complete{False}ValueType{Text}Value{Not Specified}}}
Elements{Key{111111}EncounterId{Base}ElementType{PROB}AssocProblem{Table6}DisplayName{Problems}
  Element{Key{InitialPos}EncounterId{Base}ElementType{PROB}DisplayName{InitialPosition}Complete{False}ValueType{Number}Value{Not Specified}}

| FIG. 7A |
| FIG. 7B |

```
Element{Key{CurrentPos}EncounterId{Base}ElementType{PROB}DisplayName{CurrentPosition}Complete{False}ValueType{Number}Value{Not Specified}}
Element{Key{Started}EncounterId{Base}ElementType{PROB}DisplayName{Started}Complete{False}ValueType{Text}Value{Not Specified}}
Element{Key{DateInactive}EncounterId{Base}ElementType{PROB}DisplayName{Designated Inactive}Complete{False}ValueType{Date}Value{Not Specified}}
Element{Key{Severity}EncounterId{Base}ElementType{PROB}DisplayName{Current Severity}Complete{False}ValueType{Text}Value{NotSpecified}}
Element{Key{ProblemStatement}EncounterId{Base}ElementType{PROB}DisplayName{Problem Statement}Complete{False}ValueType{Text}Value
{Diabetes Mellitus}}}
Elements{Key{598.0}EncounterId{Base}ElementType{PROB}AssocProblem{Active}DisplayName{Problems}
  Element{Key{InitialPos}EncounterId{Base}ElementType{PROB}DisplayName{InitialPosition}Complete{False}ValueType{Number}Value{0}}
  Element{Key{CurrentPos}EncounterId{Base}ElementType{PROB}DisplayName{CurrentPosition}Complete{False}ValueType{Number}Value{0}}
  Element{Key{Started}EncounterId{Base}ElementType{PROB}DisplayName{Started}Complete{False}ValueType{Date}}
  Element{Key{DateInactive}EncounterId{Base}ElementType{PROB}DisplayName{Designated Inactive}Complete{False}ValueType{Date}}
  Element{Key{Severity}EncounterId{Base}ElementType{PROB}DisplayName{CurrentSeverity}Complete{False}ValueType{Number}Value{0}}
  Element{Key{ProblemStatement}EncounterId{Base}ElementType{PROB}DisplayName{Problem Statement}Complete{False}ValueType{Text}Value
{Urethral stricture due to infection}}}
Elements{Key{999888}EncounterId{Base}ElementType{PROB}AssocProblem{Table0}DisplayName{Problems}
  Element{Key{InitialPos}EncounterId{Base}ElementType{PROB}DisplayName{InitialPosition}Complete{False}ValueType{Number}Value{0}}
  Element{Key{CurrentPos}EncounterId{Base}ElementType{PROB}DisplayName{CurrentPosition}Complete{False}ValueType{Number}Value{0}}
  Element{Key{Started}EncounterId{Base}ElementType{PROB}DisplayName{Started}Complete{False}ValueType{Date}}
  Element{Key{DateInactive}EncounterId{Base}ElementType{PROB}DisplayName{Designated Inactive}Complete{False}ValueType{Date}}
  Element{Key{Severity}EncounterId{Base}ElementType{PROB}DisplayName{CurrentSeverity}Complete{False}ValueType{Number}Value{0}}
  Element{Key{ProblemStatement}EncounterId{Base}ElementType{PROB}DisplayName{Problem Statement}Complete{False}ValueType{Text}Value
{Bladder Neck Obstruction}}}
Elements{Key{944444}EncounterId{Base}ElementType{PROB}AssocProblem{Table6}DisplayName{Problems}
  Element{Key{InitialPos}EncounterId{Base}ElementType{PROB}DisplayName{InitialPosition}Complete{False}ValueType{Number}Value{0}}
  Element{Key{CurrentPos}EncounterId{Base}ElementType{PROB}DisplayName{CurrentPosition}Complete{False}ValueType{Number}Value{0}}
  Element{Key{Started}EncounterId{Base}ElementType{PROB}DisplayName{Started}Complete{False}ValueType{Date}Value{NotSpecified}}
  Element{Key{DateInactive}EncounterId{Base}ElementType{PROB}DisplayName{Designated Inactive}Complete{False}ValueType{Date}Value{Not Specified}}
```

| Soundex | PhraseWord | ENMSegm | System | Organ | Region | Other | Releva | SoundexMulti |
|---|---|---|---|---|---|---|---|---|
| 0000000000000000000 | | HISTORY | Cardiovascular | Heart | Thorax | | 50 | |
| 1000000000000000000 | of | HISTORY | Cardiovascular | Heart | Thorax | | 50 | O10000 |
| 1300000000000000000 | bout | HISTORY | Cardiovascular | Heart | Thorax | | 50 | B30000 |
| 1300000000000000000 | bout with | HISTORY | Cardiovascular | Heart | Thorax | | 50 | B30000 W30000 |
| 1352000000000000000 | of damage | HISTORY | Cardiovascular | Heart | Thorax | | 50 | O10000 D52000 |
| 1352300000000000000 | of damage to | HISTORY | Cardiovascular | Heart | Thorax | | 50 | O10000 D52000 T00000 |
| 1352363000000000000 | of damage to heart | HISTORY | Cardiovascular | Heart | Thorax | | 50 | O10000 D52000 T00000 H63000 |
| 1352363524000000000 | of damage to heart muscle | HISTORY | Cardiovascular | Heart | Thorax | | 50 | O10000 D52000 T00000 H63000 M24000 |
| 1352363524530000000 | of damage to heart muscle Initiated | HISTORY | Cardiovascular | Heart | Thorax | | 50 | O10000 D52000 T00000 H63000 M24000 153000 |
| 1360000000000000000 | after | HISTORY | Cardiovascular | Heart | Thorax | | 50 | A13600 |
| 1361300000000000000 | after bout | HISTORY | Cardiovascular | Heart | Thorax | | 50 | A13600 B30000 |
| 1361300000000000000 | after bout with | HISTORY | Cardiovascular | Heart | Thorax | | 50 | A13600 B30000 W30000 |
| 1361365320000000000 | after bout with rheumatic | HISTORY | Cardiovascular | Heart | Thorax | | 50 | A13600 B30000 W30000 R53200 |
| 1361365321600000000 | after bout with rheumatic fever | HISTORY | Cardiovascular | Heart | Thorax | | 50 | A13600 B30000 W30000 R53200 F16000 |
| 1361365321623600000 | after bout with rheumatic fever History | HISTORY | Cardiovascular | Heart | Thorax | | 50 | A13600 B30000 W30000 R53200 F16000 H23600 |
| 1365320000000000000 | bout with rheumatic | HISTORY | Cardiovascular | Heart | Thorax | | 50 | B30000 W30000 R53200 |
| 1365321600000000000 | bout with rheumatic fever | HISTORY | Cardiovascular | Heart | Thorax | | 50 | B30000 W30000 R53200 F16000 |
| 1365321623600000000 | bout with rheumatic fever History | HISTORY | Cardiovascular | Heart | Thorax | | 50 | B30000 W30000 R53200 F16000 H23600 |
| 1365321623610000000 | bout with rheumatic fever History of | HISTORY | Cardiovascular | Heart | Thorax | | 50 | B30000 W30000 R53200 F16000 H23600 O10000 |
| 1500000000000000000 | of MI | HISTORY | Cardiovascular | Heart | Thorax | | 50 | O10000 M00000 |
| 1523540000000000000 | functional | HISTORY | Cardiovascular | Heart | Thorax | | 50 | F52354 |
| 1523545656000000000 | functional murmur | HISTORY | Cardiovascular | Heart | Thorax | | 50 | F52354 M65600 |
| 1523545656365200000 | functional murmur during | HISTORY | Cardiovascular | Heart | Thorax | | 50 | F53254 M65600 D65200 |
| 1523545656365243000 | functional murmur during childhood | HISTORY | Cardiovascular | Heart | Thorax | | 50 | F53254 M65600 D65200 C43000 |
| 1523545656365243100 | functional murmur during childhood History | HISTORY | Cardiovascular | Heart | Thorax | | 50 | F53254 M65600 D65200 C43000 A13600 |
| 1523545656365243136 | functional murmur during childhood History of | HISTORY | Cardiovascular | Heart | Thorax | | 50 | F53254 M65600 D65200 C43000 A13600 |
| 1523545656365243136 | functional murmur during childhood History of bout | HISTORY | Cardiovascular | Heart | Thorax | | 50 | F52354 M65600 D65200 C43000 A13600 B30000 |
| 1530000000000000000 | of MI at | HISTORY | Cardiovascular | Heart | Thorax | | 50 | O10000 M00000 A30000 |
| 1532000000000000000 | of MI at age | HISTORY | Cardiovascular | Heart | Thorax | | 50 | O10000 M00000 A30000 A20000 |

DATA CAPTURE AND VERIFICATION SYSTEM

BACKGROUND OF THE INVENTION

1. Field of the Invention

This invention relates to an information recording system and method of proofing the information.

2. Description of the Prior Art

Traditionally, people record information by means of hand written notes or by entering the information into a computer using standard word processing software. In the medical environment, healthcare professionals such as physicians and nurses record medical information about patients. This will include background about the patient, such as the patient's age and sex, patient history, physical examination, and subsequent information that is developed during discussions with the patient.

The physician typically requires the patient to fill out a questionnaire disclosing the personal information about the patient, the patient's background, medical information and pre-existing medical conditions. During the patient visit and thereafter the physician usually makes notes. As part of the process, the physician makes a determination regarding the patient's medical condition and defines a treatment plan.

Physicians often use a dictation and transcribing approach to record this information. However, the requirements upon physicians are becoming increasingly burdensome requiring not only a recording of information about each patient's office visits, a diagnosis and suggested treatment plan, but recently has also required the physician to allocate points based on the extensiveness of his examination and the expertise required of him, to facilitate appropriate compensation by government, and perhaps, in the future, other insurance plans.

One data entry proposal is disclosed in U.S. Pat. No. 5,704,371 which discloses a medical history documentation system and method for recording information. The system disclosed in the '371 Patent involves the communication of encoded indicia by a first person to a second person during a patient examination by the first person. The second person records this information on a recording device, entering coded indicia, leaving the first person free to do the examination without the first person having to make personal notes, or fill out forms or otherwise take time to write down information. The system suffers from the disadvantage of requiring a second person. It also does not provide for the allocation of points to the input information.

Speech recognition software has recently become available for desk top computers, such as Dragon Dictate, and IBM Voice Type. Dragon Dictate can interface with different applications, including word processors. However, it suffers from the disadvantage that there is no audio recording of the dictation stored for replaying during editing. While the IBM VoiceType version retains both a sound and a text file, the text from the speech recognition engine is input directly into a propriety text processor. The system decides when the speech recognizer models are updated, and does not allow direct updating of the sound files. U.S. Pat. No. 5,799,273 addresses the issue of allowing audio data to be stored corresponding to the edited text by updating the audio file when the text file is edited. It does not, however, provide a facility for highlighting suspicious text portions for the benefit of a proofreader and no facility exists to associate positional information with the text to ensure that data input into a document having a predefined format and layout does not get corrupted during editing by inadvertently ending up in a different section of the document.

The present invention seeks to provide an efficient means of gathering data in a structured document and subsequently verifying the accuracy of the data while also associating other information with the data such as points allocated to certain portions of the data.

SUMMARY OF THE INVENTION

According to the invention there is provided a system and method for data entry and decision making which includes a prompting stage, which prompts the user to enter data. One embodiment disclosed is a medical application. However, the invention is not so limited.

The input of the information involves the use of a computer. The user of the system inputs the information using any suitable input device, including a keyboard, oral input in conjunction with speech-recognition software, touch screen or mental manipulation of a cursor, etc., or any combination thereof.

The system and method of the invention further includes backtracking functionality for entry of subsequent further necessary data, and additional backtracking functionality where the necessary minimum data has been entered but a decision making process determines that the user may desire to add further data.

The method may include an accuracy monitoring capability to monitor, and possibly, make perceived corrective changes to the entered data. The method may, for instance, include a dictionary of undesired terms and/or a dictionary of desired terms which compares the entered data to the dictionary of words or phrases, and highlights and/or offers alternative terms or phrases from which to choose, or corrects perceived incorrect data. Separate dictionaries dealing with different categories, e.g., symptoms, anatomical regions, etc., may be included for use by one or more different data entry locations. Alternatives may be displayed based on the category or categories associated with that part of the document.

The method may be implemented in a client-server system wherein all or some of the data and quantitative measure assigned to the data is sent from the client to the server for evaluation. The data may, for example, include text that is proofread by a person on the server side or is transferred to a third party proofreader via a server or directly from the user who enters the data.

Typically the information is put into a document having a predefined structure, with one or more sections, each section having one or more data entry locations, and the user is provided with the ability to jump forward and backward in the document. Thus, data entry may take the form of input into a predefined table or form having a certain layout. Different forms may be provided depending on the complexity of the case and the nature of the user. Structural information associated with the data may be retained through the use of a database or, if the data is serialized, by associating tags with the data, thereby retaining the structural information. Thus the complexity of the document chosen by the user will determine the number of rows pulled up from the database table for data entry.

In addition to merely highlighting the next data entry location, a visual or oral prompt may offer one or more choices from which the user may select.

Further, according to the invention there is provided a calibrated document having a predefined structure having one or more sections to which points or another quantitative measure can be assigned. The points can be manipulated such as by adding some or all of the points.

The method and system can include a scoring stage in which points or another quantitative measuring feature is ascribed to the data. The resultant score is manipulated, such as by adding the points for a section of the document or for the document as a whole, to provide a quantitative measure, facilitating further action or a decision making process, such as supporting a given level of billing.

The points or other quantitative measure of the data input may serve to measure the qualitative and quantitative value of tasks performed by a user. For instance, a physician examining a patient, may be given points based on the extensiveness of the patient evaluation and the complexity of the diagnosis. He may also be given points based on the severity of the patient's illness or the amount of expertise required of the physician.

The method is implemented on a computer system and the system may include functionality for prompting the user in order to maximize the points. Thus, the system may determine that the number of points for a particular section can be increased by entering merely one or two additional categories. By monitoring the accumulated points for a particular section or for the document as a whole, and by determining a distance to the next predetermined threshold level, the system may prompt the user for additional input. This may be achieved by providing a visual representation of the data collected, e.g., using a tree structure.

In order to assign points or other quantitative measures to the entered data, each piece of information is predefined as being associated with one or more points or other quantitative measure. Thus, a single response may include more than one element and have more than one point attributed to it.

The system may also adjust the prompting of the user for data input by monitoring a user rhythm or speed of data entry, and may proceed to the next determined data entry location after a system-determined period of time. Alternatively, speed of data entry may be user determined, wherein the cursor or other prompt on a computer monitor (e.g., a highlighted data entry location indicating the area of data input) moves to the next determined data entry location once data has been entered by the user into the previous data entry location or after a period of time set by the user. Where the system establishes a user rhythm in moving from one data entry location to the next, the speed may be manually adjusted by the user, or interrupted by means of a pause feature.

Data entry may also be facilitated by making use of predefined portions of data such as text which are insertable by using a keystroke or keyword, for example, and can, for simplicity, be referred to as macros. Such macros may cover more than one data entry location and can result in the assignment of points or filling in of scores for the associated multiple locations. These scores may be predefined or calculated by the system.

Further, according to the invention there is provided a proofreading process, wherein data is entered orally using speech-recognition software. The process may be implemented on a system that includes a spell checker (for data that was entered using a keyboard or was entered by specifying the individual letters constituting a word) and/or a grammar checker. It also includes a mechanism, in the form of Soundex codes, for performing an acoustic analysis. The various data accuracy mechanisms may include means for prompting a user with alternatives to choose from. The system may also include a list of unexpected terms. This allows data corresponding to an unexpected term to be highlighted, alternatives presented, and/or replaced with an alternative. Where the term or terms are highlighted a person acting as proofreader will be prompted to verify and, if necessary, correct the data entry.

The system may also store the data both as a sound file and as a text file that is created pursuant to conversion by speech-recognition software. In this situation, a proofreader may receive both an audio version of the data and a text version that is synchronized with the audio version. As such, the method envisages the proofreader reviewing the text visually while simultaneously listening to the audio version. Words or phrases of concern may be visually highlighted by the system in the text version. The audio version may also include a sound marker to identify a word or phrase of concern. Thus, the system includes transmitting both a sound file and a text file to the proofreader, synchronizing the two files and including means for highlighting or otherwise emphasizing words or phrases requiring specific attention of the proofreader. The text file also includes positional information associated with the data to define the location of the text in the document, as well as points information about the data.

Changes made to the data by the proofreader are typically sent back to the user together with positional or structural information, and any points changes, to allow the data on the user side to be corrected, and also to teach the speech-recognition software.

As mentioned above, to facilitate the data input, predefined portions of data, referred to here as macros, may be provided allowing the input of predefined portions of data, such as text. These macros may immediately be inserted into the table, form, or other document and may be demarcated visually in the text version when displayed on a visual output device such as a computer monitor. The macro may also be audibly demarcated in the sound file to indicate to a listener, the beginning and the end of the macro. Alternatively, the insertion point of a macro may merely be indicated in the text file without actually inserting the data. It may, thus, be defined by a suitable visual indicator when viewed on a monitor, for example, by means of a keyword. Similarly the insertion point of the macro in the sound file may be indicated by an audible tag such as a keyword which is audible to the listener. Thus the proofreader need not get involved with the macro data, e.g., the wording, in the case of text data, and is merely provided with an indication as to the point of insertion of the macro in the rest of the document, or the macro text may be displayed but automatically skipped over by the system during proofreading. In one implementation, data inserted into the document may be associated with tags to ensure that the data may be stored in a database while retaining structural and other information about the data. The proofreader may be presented with some or all of the data, while some or all of the structural or other information (e.g., points allocated to the data) may be withheld from the proofreader. Sensitive data may also be withheld from the proofreader or require a password to restrict access.

Preferably the playback speed is adjustable by the proofreader, both the audio and text versions working in synchrony with each other to ensure that the text follows the playback of the sound file and vice versa. This is achieved, for example, by placing tags or synchronization markers in the text and sound file, or by including speech-recognition software and a search engine to locate a portion of the text file corresponding to a portion of the sound file, or by saving the text and corresponding sound file portions in one table or linked tables of a database. Thus, the user can fast forward or rewind through either file or jump around in a file without losing synchronization.

In the above physician/patient context as well as in any other applications, the service provided by the service provider of providing a physician with means for collecting data about his patients can be used by the service provider as a revenue stream from the users (e.g., physicians). The physician or other user may be required to pay a fee for the use of the patient or other data acquisition software.

Revenue streams may also be obtained from users of the data entry software by providing the optional proof-reading service that can, conceivably, be performed at a remote low labor cost location.

BRIEF DESCRIPTION OF THE DRAWINGS

FIGS. 5 and 6 illustrate data entry tables used in the invention;

FIG. 7 is a serialized representation of some of the data of FIGS. 5 and 6;

FIG. 12 is a table showing words and phrases, corresponding Scundex codes, and structural information in the form of categories with which the words and phrases are associated.

DETAILED DESCRIPTION OF THE INVENTION

Figure 1:
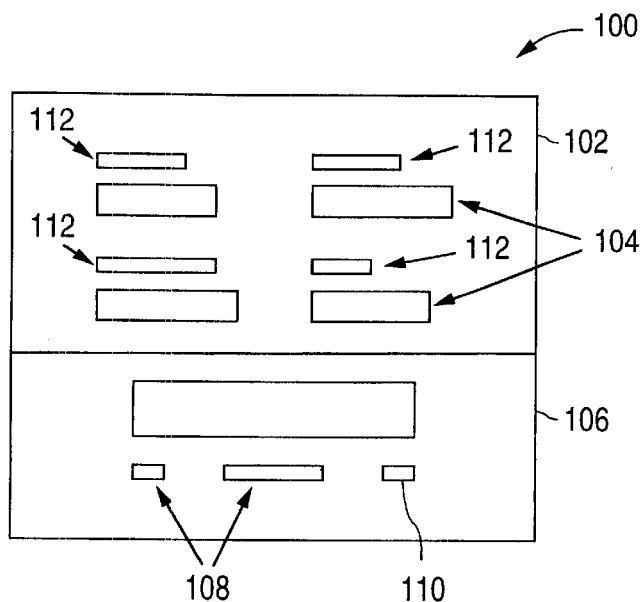
FIG. 1 is a schematic representation of a user interface.

FIG. 1 shows a simple user interface 100 which can be implemented on any system based on a graphic user interface such as Microsoft Windows, Apple graphic interface, etc. The top area 102 of the user interface 100 constitutes the user text entry area. This area is typically provided with a predefined document entry format having specific user data entry locations 104. It will be appreciated that a form may have only one data entry location. This may take the form of a table with rows and columns, or a form or template (for example, for a patient encounter with a urology specialist versus a cardiology specialist), or other document having predefined sections. The lower part 106 of the user interface 100 presents the user with data or information retrieved by the system. The user interface 100 may also include buttons or icons 108 or a text entry area within the lower region 106 to establish a connection with a third party. The lower area 106 may also include a user selection facility 110 in the form of a drop down menu for selecting the user preferred method of information presentation. The interface also incorporates labels 112 which serve to prompt the user for input.

Figure 2:
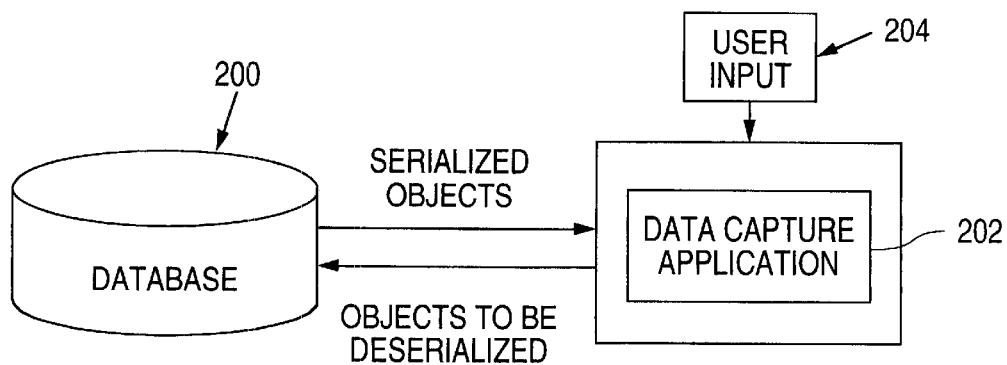
FIG. 2 is a simple schematic representation of a data capture system.

In one embodiment, proposed by the invention, data is entered by means of voice input in which speech-recognition software converts the sound input into text format. Text information is then displayed in an appropriate data entry location 104 in the form 100. The data that is entered, as well as any structural information or other information associated with the data, is saved in a database 200, as illustrated in FIG. 2. Thus, the data capture system 202 includes a user interface which receives the user input, and facilitates the saving of the information in a database 200.

It will be appreciated that in the case of a voice activated system in which data is orally entered into the system, keywords may be established for use by the user to move around in the document and between the upper and lower portions of the user interface and to edit any of the data input or information retrieved. Thus information entered by the user into the upper portion 102 as well as information specifically requested in the lower portion 106 by the user can be used by the system, for example, a search engine to locate information relevant to the user's needs.

The invention envisages providing a variety of data entry templates, which may be selected from by the user to meet his or her needs. Thus, the templates may be specific to the area of expertise of the user, e.g., urology, and may further include more or less complex data entry templates, depending on the number of issues that are to be addressed. For instance, a urologist may have several templates to choose from in his field of expertise, depending on whether a particular patient is a first time patient requiring extensive consideration of background material such as family history, or not. The user is provided with buttons or a drop down menu, or other means from which to select an appropriate template.

Figure 3:
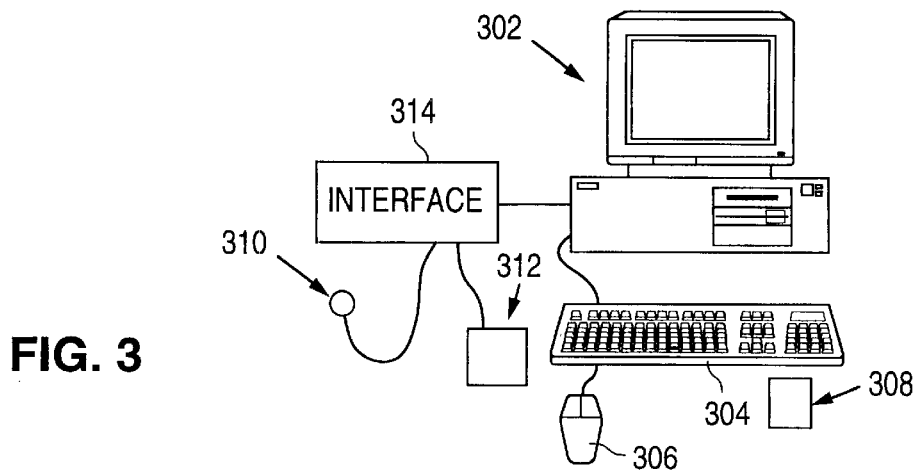
FIG. 3 illustrates a speech-recognition system.

FIG. 3 illustrates a speech recognition system that includes a personal computer 302 having a keyboard 304 for inputting or editing text, and a mouse 306 for manipulating a cursor. The system further includes a storage medium such as a floppy disc 308 for loading applications into the computer. In a speech recognition environment, the applications would include speech recognition software that includes a speech recognition engine, a word processor and an interface to control the flow of text into the word processor and the flow of updated information from the word processor back into the speech recognition application to serve as part of the learning curve for the speech recognition software.

The system further includes a microphone 310, a speaker 312, and an interface 314. Audio signals from the user are sent from a microphone 310 to the interface 314 which converts the audio signal into a digital signal by means of an A–D converter. During playback of the recorded audio signal to the speaker 312, the interface 314 converts the digital signal back to an analogue signal by means of a D–A converter.

Figure 4:
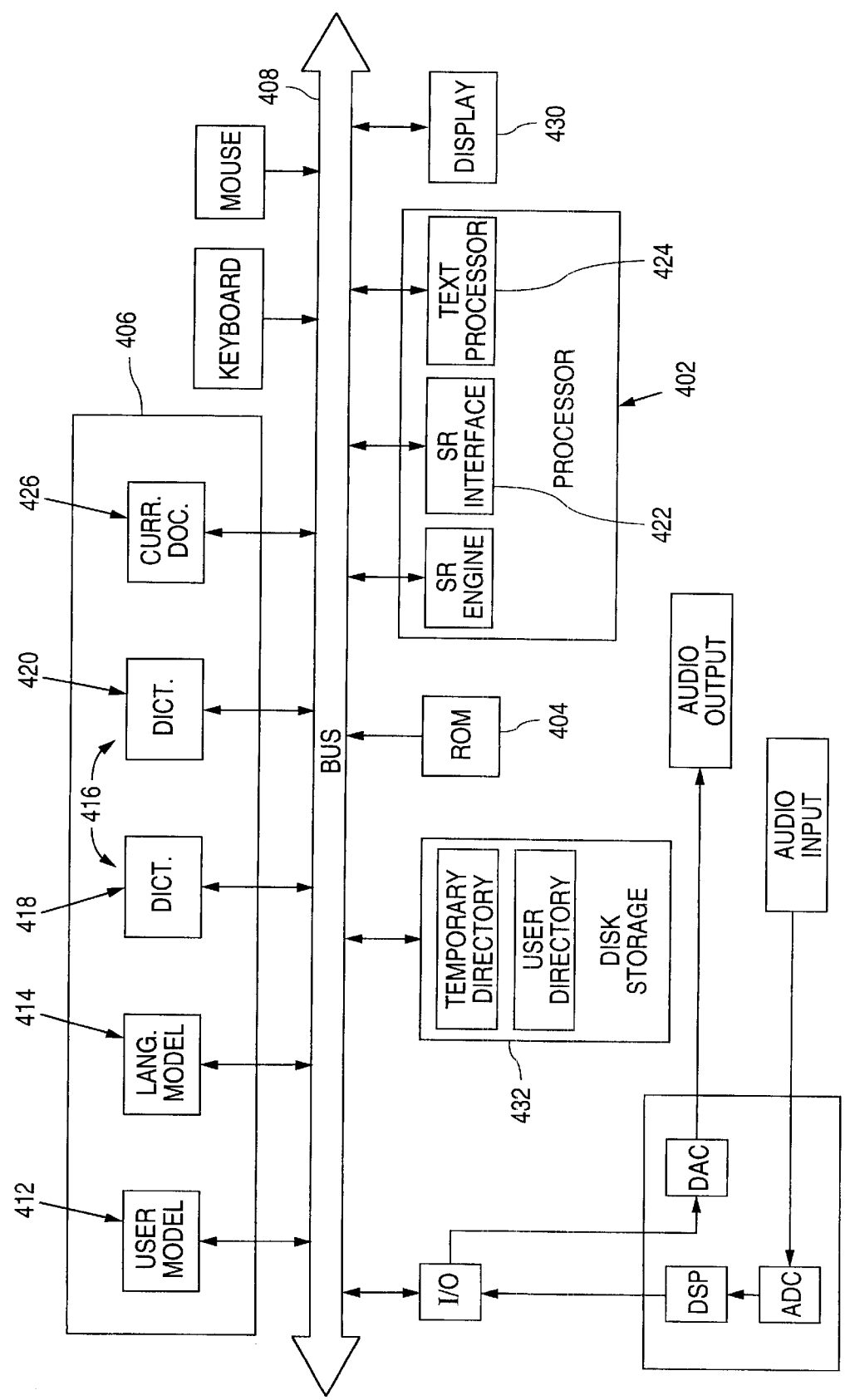
FIG. 4 is a schematic overview of the internal architecture of a computer system.

FIG. 4 shows schematic overview of the internal architecture of a computer. The computer includes a processor 402, a read only memory 404, a random access memory 406, and a bus 408 that links the various components to the system. The random access memory (RAM) is used for storing application program systems and data for the speech recognition application. It will be appreciated that any application programs can be stored in ROM or another appropriate storage medium. The data for the speech recognition application comprises a user model 412 which can be updated to improve the accuracy of speech-recognition, a language model 414, and a dictionary 416 to which a user can add new words. The user model 412 includes an acoustic model and a contextual model. The acoustic and contextual models are typical components of a speech-recognition system, as known in the art, to assist in converting speech into text. In addition to such known models, the preferred embodiment of the invention proposes the use of Soundex codes, which involves retrieval of words and/or phrases that sound similar to those orally entered by the user, even though they may have different meanings, e.g., meet and meat. The present invention includes not only the standard dictionary of desired terms 418 but also a dictionary of undesired terms 420. The system can therefore be set up to be user specific to include terms found in the user's particular field of art, storing these terms in the dictionary 418, and storing terms that would typically not be found in the user's area of expertise and storing these in the dictionary 420. The dictionaries 418, 420 can include categories so that alternatives presented can be matched to the context of the discourse. Thus, each of the dictionaries 418, 420 may comprise more than one separate dictionary tailored to different categories of interest, e.g., anatomical regions, symptoms, etc. The various categories may correspond to sections of the document or may be specific to one or more data entry locations. It will be appreciated that the various models may use the same sets of dictionaries 418 and 420.

As the speech recognition software converts the user's oral input into text a speech recognition interface 422 causes the data to the text processor application 424 to form a document 426 in memory. A display 430 also displays the text of the document 426.

The system also includes a non-volatile storage medium in the form of disc storage 432. The disc storage 432 includes a temporary directory used by the speech recognition engine for storing run time files containing the speech recognition output data. The disc storage 432 also includes a user's directory for storing document files emanating from the word processor and associated link data created by the speech recognition interface.

As is illustrated in FIG. 2, captured information is stored on the database 200 in the form of objects. These objects thus have information associated with them such as properties pertaining to the objects and methods associated with the objects. In this manner data that is captured by the user may have structural information and points information, discussed in greater detail below, associated with the data. Thus, associated information can readily be saved in a database. In some cases it may be desirable to transfer the data in a flat file format, e.g., if the receiving device has limited memory and cannot support database management software. In such a case, the data and associated information is serialized, as illustrated in FIG. 2, to transfer the information retrieved by a data capture application 202, to a location remote from the database, such as for data collection. Similarly, data to be placed into the database, is again, deserialized and the data stored in the appropriate rows or columns of the database table as defined by a database manager. It will be appreciated that the computers involved may take any one of a number of forms, e.g. laptops, palmtops, Personal Digital Assistants (PDAs), etc.

This is best illustrated in FIGS. 5, 6 and 7 in which FIG. 5 shows a table 500 comprising rows, and columns. Similarly, FIG. 6 illustrates a table 600, including rows and columns. These tables are to a large extent, illustrated in serialized form in FIG. 7. Table 500 identifies, in column 502, the patient identification number (PatientId). Column 504 gives the encounter of the patient, i.e., when the patient was seen and includes date entries. Column 506 identifies various element types or families of information which, in one embodiment, correspond to sections of the data entry form. Thus, each patient will have these elements associated with him or her. These include PROB relating to the type of problem associated with the patient, e.g., asthma, hypertension, etc., which are identified in column 508 by identification numbers. Column 506 further includes elements relating to HPI (history of present illness), ROS (review of system), PFSH (past family and social history), PE (physical exam), CC (chief complaint), MDM (medical decision making), and an element permitting text substitution for a given keyword, identified here as MACRO. Column 510 identifies the order in which information is entered, e.g., CC will be inserted first, then HPI, followed by ROS, etc. Column 512 identifies the complexity of the case, and can be related to the score assigned to a particular task. Column 514 includes elements identifying the area of specialty, e.g., urology, or a general area called BASE. Column 516 adds prompt text corresponding to the internal elements of column 506. By using a separate column for the prompt text, a system can readily be implemented in any human language without having to adjust any of the internal elements. Column 518 elaborates on the type of problem associated with the patient.

Table 600 contains entries that are children of the entities in Table 500. Each row of Tables 500 corresponds to a separate element type, each element type, e.g., HPI, representing a collection of elements contained in Table 600 that have the same element type. Tables 500 and 600 present information about a number of patients as identified by the PatentId. Tables 500 and 600 represent information about all the patient encounters. All of the elements associated with a particular patient will have the same Patient ID as identified by column 602 of FIG. 6. Among the PatientID records, those representing a given encounter will have the same Encounter ID, as illustrated by column 604. As illustrated in column 606, all of the entries associated with the Element Type "History of Present Illness" (HPI) from Table 500 are given as Element Type HPI. Column 608, entitled "Display Name" lists various types of HPI by location of the illness, pain quality, pain severity, etc., and provides the text for the prompts to be displayed or to be spoken by the system to elicit specific information about a patient at a particular visit. Thus, the physician is prompted to identify the location of any pain, the pain quality, the pain severity, the pain timing, the duration, and other information about the patient's symptoms. The physician enters the data which is stored in column 610. The data type, e.g., text, is given in column 612. In the embodiment shown, column 614 is included to identify an internal code associated with the entered data. A score is assigned whenever data is entered. This may simply be one point per data entry or may be weighted to take account of qualitative factors in addition to quantitative factors. For example, the expertise of the physician, the amount of work involved in establishing and recording the data, and other qualitative and quantitative measures of the data entry can be considered in providing a score for a data entry. This is recorded in column 616. Column 618 identifies the person recording the data and, in the physician example, this can be either the physician or another medical staff member such as a nurse. Once the data entry for a particular row is complete, column 620 identifies the element by a check mark. The user can do this by verbalizing a predefined keyword, e.g., "enter", hitting a button on a keyboard, or any other input technique. Instead, the user may be given a predefined time period or system determined time period to enter the data, before the system identifies the data entry for that element as being complete, and moves to the next data entry location. Typically, the system moves to the next data entry location by prompting the user for data entry at the next location. Even where the time period for data entry is user determined or determined by the system, based on past data entry rhythm or speed by the user, it will be appreciated that the timing may vary from one data entry location to the next. It will also be appreciated that predefined data, referred to herein as a macro, can cover more than one data entry location and be associated with a score of more than one point. Thus, a macro may deal with one or more groups of elements such as HPI or portions thereof, i.e., cover portions of one or more groups, e.g., pain quality and pain severity of HPI, and part or all of ROS. Where more than one data entry location are accommodated by a macro entry, the system will typically move to at least the next open data entry location for purposes of prompting the user for data entry.

In one embodiment, the identifier for the macro would appear multiple times in ElementCollection column 518 of FIG. 5. Each appearance would have a different Element-Type in the ElementType column 506, one for each group of elements (CC, HPI, ROS, PFSH, PE, etc.) that will have one or more elements in the table in FIG. 6. Invoking this collection would pull out rows in Table 6 that have a ParentCollection identifier in column 622 that corresponds to the identifier in column 518. These identifiers could represent different categories such as elements from HPI, ROS, PE, or others.

An alternative embodiment is shown in the example illustrated in FIG. 5, the last row comprises a MACRO entry defined in column 508 as PREESWL. In lines 3 to 12 of Table 600, PREESWL is identified as comprising ten elements. As shown in column 606, these include HPI, two entries for PFSH (one for past history, and one for family history, as shown in column 608), an entry for ROS, four entries for PE, and two entries for MDM. As shown by column 622, the various entries are assigned a complexity of 2 and are given the text shown in column 610. It will be appreciated that the person defining the complexity can decide on the appropriate value depending on qualitative and/or quantitative factors such as the expertise required of the physician, the difficulty in making the determination, the time involved in making the determination, etc. The complexity value given in column 512 of table 500 is used as a weighting factor in this embodiment. Clearly, an embodiment could, instead, have merely one set of complexity values in either table 500 (to define the complexity for an element type) or table 600 (to define complexity on an element by element basis). In yet another embodiment the system could calculate appropriate complexity values as data is entered by the user. This could be based on various factors, including the time taken to enter the data, the expertise of the user, etc. Thus, in one embodiment, the system would provide a user input location for identifying the user. This would then be stored in column 618 for data entry rows associated with that session.

FIG. 7 represents the serialized form of some of the information (not including information about the person regarding the data) given in tables 500 and 600. It shows the corresponding information in the third to eleventh rows, in which the third row corresponds to the associated information (tenth row) in Table 500 and the fourth to eleventh rows in FIG. 7 represent the corresponding information (thirteenth to twenty-eighth row) in Table 600 (except the information about the person recording the data). Thus, by defining the input data as objects having certain properties and methods, not only the data entered by the user, but also information about that data is retained for purposes of transmission. An example would be "Pain Severity: Five on a scale of ten" where "Pain Severity would be the verbal tag that would ensure that the data "Five on a scale of ten" would be correctly placed in the document.

It will be appreciated, however, that instead of serializing the information the associated information may be transmitted by transferring the entire database or a portion thereof. An advantage of defining objects in a generalized object table is that properties and methods can be added or subtracted without changing the table structure by having to add or subtract columns. The table format retains the necessary associated information, such as, structural information, about the entered data.

Figure 8:
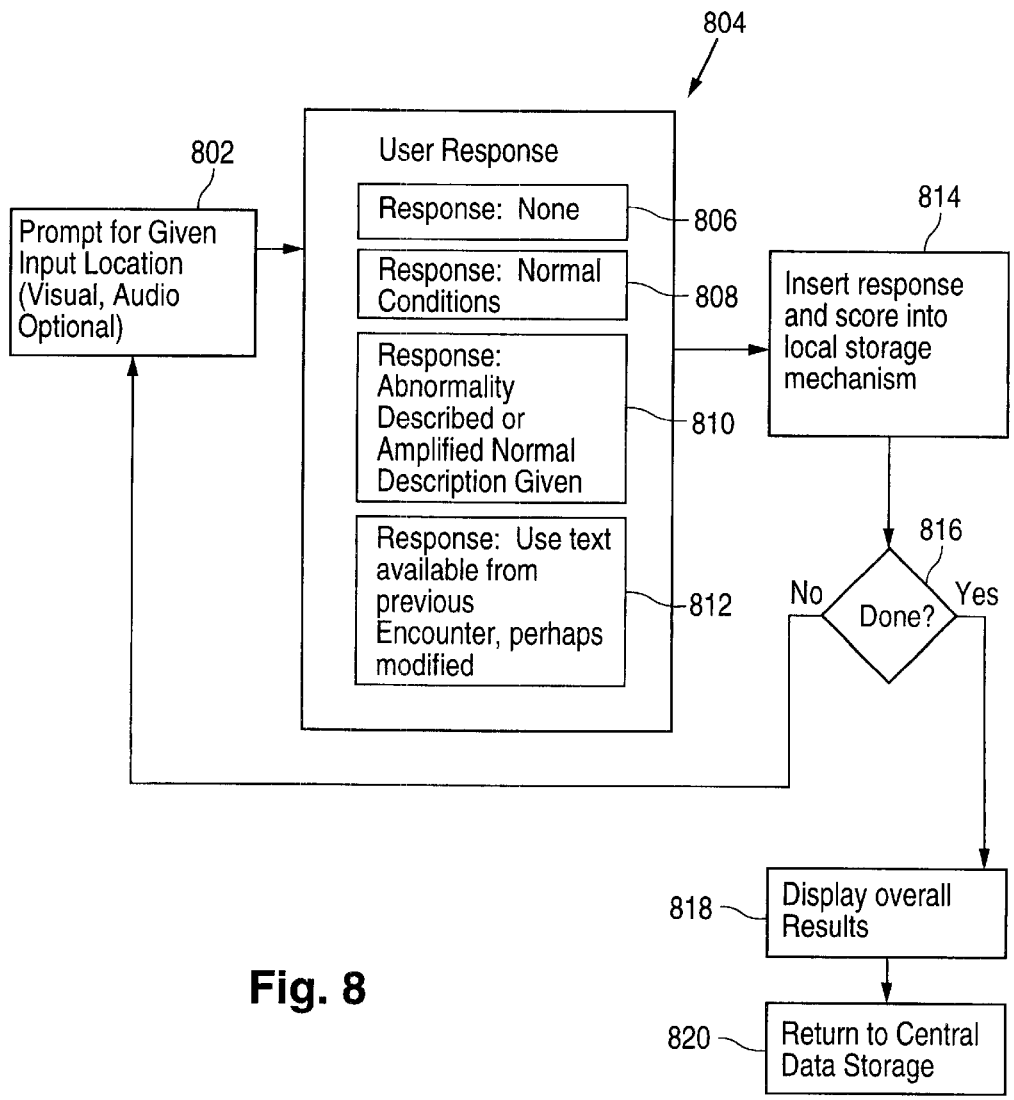
FIG. 8 is a flow diagram illustrating user input of data and scoring of the data.

As discussed with reference to FIG. 1, the data input document is divided into sections requiring data entry into predefined data entry locations within the sections. However, it will be appreciated, that the entire data input document, which may take the form of a template or form as illustrated in FIG. 1, or may be in the form of a table, may constitute only one section with one or more data entry locations. The data entry locations defined as 102 in FIG. 1 are highlighted or otherwise prompted for user input as illustrated by Block 802 in FIG. 8.

The user response 804 can take various forms, including no response at all, as illustrated by Block 806 in which case the user simply moves the cursor or other prompting feature to the next data entry location in the document. The user response may, instead, merely indicate that conditions are normal as illustrated by Block 808. In case of an abnormality in a patient's condition, the physician may specify the abnormality 810. The physician may insert or specify for insertion, predefined data such as text, which may take the form of a macro as illustrated by Block 812. This is retrieved by the user using keywords to insert the appropriate data. Instead, the user can be presented with a list of choices from which the user may then select the appropriate data.

The response from 804 together with a score associated with the data is then stored in a local storage mechanism 814, such as the database 200. A decision is made at 816 to determine whether all the data has been entered into the document. If not, the user is prompted for further input, 802. When all the data has been entered, the overall result is displayed as indicated by Block 818, and the information sent to a central data storage facility, as illustrated by Block 820.

As the user enters the data, he may become aware of data entry locations that he has missed and may move the cursor or other prompt to the specified location. This allows the user to jump around in the document and enter his data. In a preferred embodiment, the user is given the ability to indicate at a given point that additional text will be dictated later. The additional data may then be entered by the user or a third person at a later time.

In order to allow data to be entered by a user using a portable voice recording device such as a digital or analog voice recorder the preferred embodiment allows data entry locations to be orally specified by means of keywords. Any data that is entered, that is associated with the keyword, e.g., data that immediately follows a keyword, can subsequently be downloaded into the system without losing structural information and processed in batch mode. Thus, the keywords serve as tags that link the subsequent data with particular data entry locations in the document.

Typically, however, the user will adopt a certain data entry sequence that may be monitored by the system and cause the system to automatically prompt the user for data input at the next system determined location. Thus, the system may be set up to automatically move on to the next section after a predefined period of time, or may monitor the user's input rate and rhythm to find an appropriate time delay before moving onto the next data input area. The rhythm can be established by measuring say one-and-a-half-times the average pause between elements of dictated input and assuming that if the user dictating has not uttered additional dictation by that time, that he or she does not want to provide further information for that data entry location. In a preferred embodiment, the user is provided with means for adjusting the prompting rate. A particular user may habitually enter data into only part of a form. The method includes a system in which data entry is monitored to ascertain a pattern, for example, data entered into certain rows and columns and leaving other rows and columns blank. By recording the data entry patterns of the last three sets of data entry, for example, the system may automatically highlight, or otherwise prompt, the user to input data at the next input location in the pattern. Thus the data entry sequence of column 510 in table 500 is adjustable by the system. The most likely next place of entry reflects what has happened in the immediate past. Thus: if an abnormality is recorded in the recent part of the sequence, it is most likely that the next item will be abnormal as well.

In a preferred embodiment points or some other scoring is associated with the data input. A data entry location may involve data input which is associated with one or more points depending on the quantity or quality of the work associated with obtaining such information. For example, in a physician/patient environment, the extensiveness of the patient examination and the complexity of the symptoms and expertise required of the physician would be factors considered in determining the appropriate points to be allocated to the data required for entry into a particular data entry location. The system, according to the invention, also has the ability to arithmetically manipulate the scores, for example, by adding the points to determine a total score for a section or for the entire document. In a preferred embodiment, predetermined threshold levels are established. If it is determined by the system that the score for a certain section or for the document as a whole is within a predefined range of the next threshold level for that section or document, it prompts the user for further data input into data entry locations determined by the system to bring the total score up to the next higher level. For example, if a urologist dealing with the symptoms section of his examination accumulates a score of 18 points, and the system determines that a minor additional examination would take his point level up to the next higher score of 20, it could prompt the urologist for the appropriate additional input. In a preferred embodiment, the user is presented with one or more visual representations or depictions of the data entry locations or groups of data entry locations, e.g., entire sections, that have data in them and the points associated with such data entry locations. Typically some or all of the data entry locations that do not have data in them are also depicted. In a preferred embodiment, the computer system will determine those data entry locations or groups of data entry locations that are most likely to lead to the next higher score level, and will only depict those data entry locations or groups of data entry locations. This can take the form of one or more tree structures from which the user may select, thereby allowing him to view the information in the appropriate amount of detail. The visual depictions can differ in the amount of entered data they display, or the degree to which individual data entry locations, as opposed to sections or groups of data entry locations are depicted. The breakdown of points can thus be readily ascertained and appropriate extra data entered to increase the score.

In order to improve the quality of the data entry and avoid unnecessary errors, the system includes a dictionary of undesired terms and/or a dictionary of desired terms directed toward the type of data entry of the particular user. For example, a urologist will typically use a specific set of terms and phrases in defining patient symptoms. The data input is compared to the dictionary terms, and any data input that falls outside the parameters of the dictionary of desired terms (which includes standard words such as "and" and "the") or within the undesired terms is highlighted. For example, the text is bolded or the color changed or other highlighting feature used, to draw the attention of the user to the suspicious data entry. The user may also be presented with alternative options:that he or she may then enter or select from. Information is also fed back to the speech-recognition software as part of the learning mechanism of the software. Clearly, where data is input by the user using an input mechanism other than oral input, a dictionary of terms may still be included to verify data input. Spell checkers and grammar checkers may also be included to improve the quality of the data input. It will be appreciated that any prompting of the user for selection of an alternative or highlighting of a suspicious data entry, is not limited to visual prompting but could equally well include an audio prompt.

Input by the user may be achieved by any number of known methods, for example, using a keyboard, a touch sensitive screen, making use of character recognition software, etc. In the preferred embodiment data is, however, entered by vocal commands interpreted by speech-recognition software, which converts the oral data from the user into text and stores it as a text file. A number of speech recognition systems are currently on the market for desktop computers, including Dragon Dictate and IBM VoiceType. Preferably, the oral input is also saved as a sound file to assist in subsequent proofreading, as discussed in greater detail below.

In order to give the user feedback on the data he enters, he is provided with a display that displays the data entry table or form and any entered data. Depending on the user input screen chosen, the output, whether displayed or printed, will vary. One output is a transcription that looks like a document as it would normally appear (e.g., a medical chart). Another output is comprised of the filled out template elements including or not including the associated scores, perhaps with each new element on a separate line.

In one embodiment the user can be provided with an "I accept" button which allows the content of a given encounter/session to be locked. This output may be preceded by a processing phase in which the output of the speech recognition can be refined based on the additional contextual information (namely the whole document). One way to accomplish this would be to record all the decisions as they were made and review them in the light of the overall document by monitoring which contextual dictionaries or lexicons were used during completion of the form, identifying inconsistencies in the group of lexicons, and, by using appropriate substitution lexicons, revising words that were previously entered into sections based on the inconsistent lexicons.

As pointed out in U.S. Pat. No. 5,799,273, it is advantageous to provide both a sound file and a text file, to assist in subsequent proofreading, and to link the two so that positional changes of characters are monitored and linked and audio components are updated to allow playback of the sound file in synchronicity with the text file. One way of achieving this is described in the '273 Patent, using link means for forming link data between the audio portions and the corresponding character strings.

Thus, in the preferred embodiment, in which data is entered orally using speech-recognition software, both the text file and the original sound file are transmitted to the proofreader to allow the proofreader to view the text and listen to the oral sound file corresponding to the text. It is contemplated, in one embodiment, that the data entry system be linked by a network, such as an intranet, extranet, or the Internet to the proofreader who may be located in a different state or country. The sound and text files are synchronized with one another to allow the proofreader to simultaneously listen to the voice data while viewing the text data. The proofreader is also given the ability to jump forward or backward in the sound file and have the text portion track the sound file in synchronized fashion. Similarly, the user may scroll up or down in the text file and have the location in the sound file move backward or forward in synchronicity with the text file. This can be achieved in a number of ways, including the use of tags or synchronization markers in the text and sound files or by including speech-recognition software to monitor the next snippet of information on the sound file and converting this to text, thereafter locating the corresponding portion of the text file by means of a search engine as known in the art. In the case where tags are used, the tags in the sound file can comprise sound signals corresponding to the various data entry locations. In order to avoid distracting a proofreader during the proofreading process, the sound signals may be at a frequency above human speech and can be filtered out using a low-pass filter. Instead, a frequency range can be chosen for the signals, that is outside the range detectable by the human ear.

Another way to synchronize the files would be to place the beginning and perhaps end times for the speech related to a given category into a property of that object. For example, if History of Present Illness\Pain Severity began at 11:23:06 and ended at 11:23:11, those two times would appear as properties of that response in the record and would be available as tags in the text being proofread so allow synchronization with the elapsed time of the dictated speech.

In yet another embodiment the sound file and text file can be stored in the same table of a database or in linked tables of the same database. Thus the portion of the sound file corresponding to a section of text for one or more data entry locations can be saved in the table with the text data. For example, table 600 could merely be amplified to include a column for the sound file portions.

Information about a document as opposed to the actual data constituting the document may be incorporated by way of tags as is known and described in GML, ISO/ISC8879. Thus, by adding tags of a format control language such as XML, TeX or GML, abstract format information can be added to a document, thereby allowing the layout of the document to be changed without losing formatting. Thus, layout information can be changed, such as changing the column arrangements, without compromising the logical structure.

In the case of oral data input, the user typically has speech-recognition software on his own computer, thereby giving the user visual feedback on his data entry. One embodiment of the invention, however, contemplates the proofreader having additional, more powerful speech-recognition software, and using the sound file to create a higher quality text file for purposes of proofreading and correction. Another embodiment contemplates using more powerful hardware and speech-recognition software system to preprocess the dictation prior to its reaching the proofreader.

Figure 9:
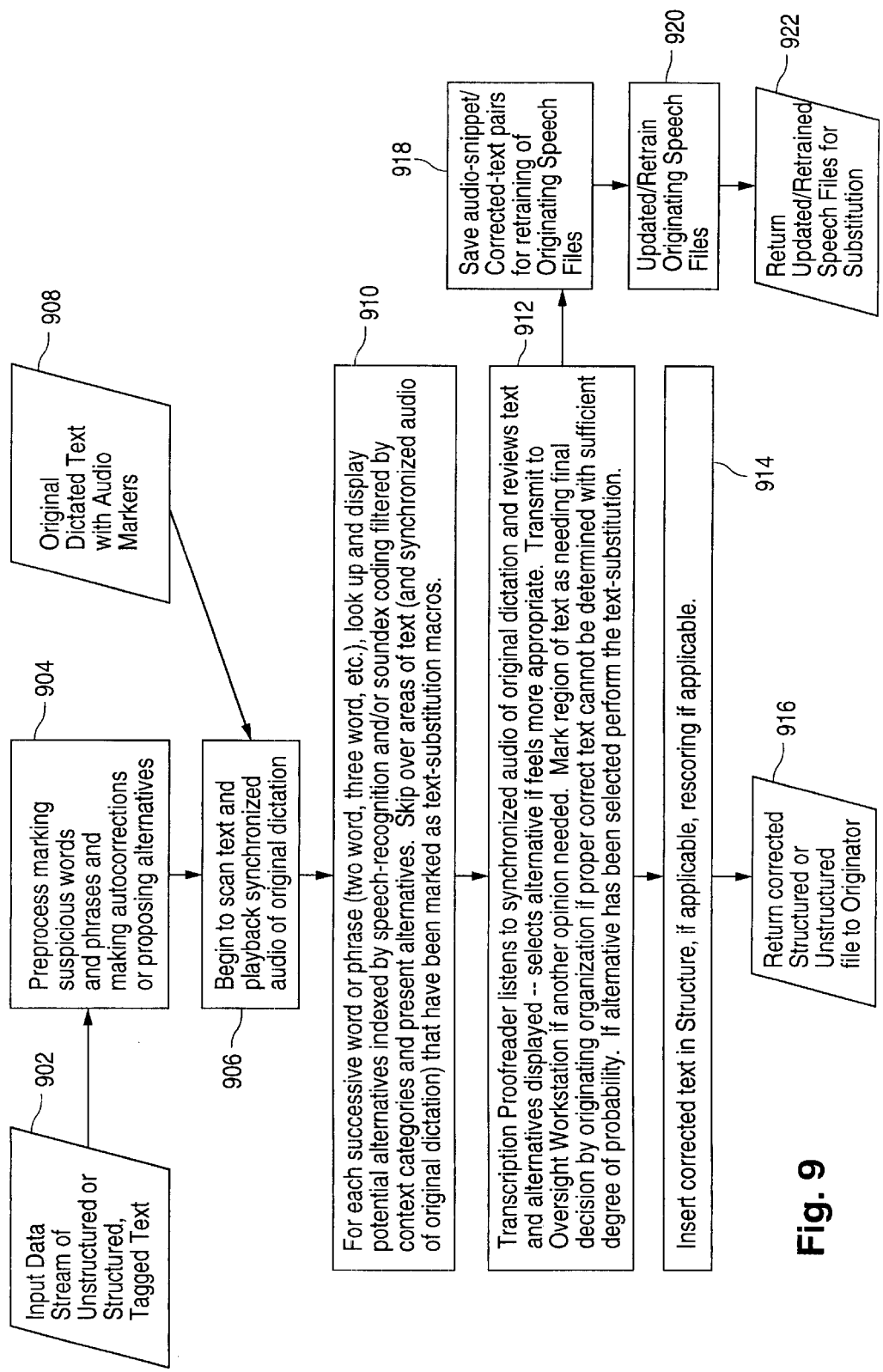
FIG. 9 is a flow diagram illustrating one embodiment of a proofreading process.

One embodiment of the proofreading process is illustrated in FIG. 9 in which the input data stream 902 optionally is preprocessed in block 904, either on the user side or on the proofreader side, or both, and special words or phrases are marked. These special words or phrases may automatically be corrected by the system, or are corrected by the user or proofreader. Instead, the system may present the user or proofreader with alternatives for replacing the suspicious data. Any preprocessing of Block 904 may involve input from spell checkers (insofar as data was spelled out to the speech-recognition software or was entered by other means that could introduce spelling errors) and grammar checkers, monitoring the input into the data file. In Block 906, the text file and sound file 908 are played back in synchronized form. Further input verification and improvement takes place in step 910 in which the speech recognition software, either on the user side or the proofreader side, causes alternatives to words that are potentially erroneous to be displayed. Dictionaries may be set up for the particular user's needs. The dictionaries may include separate one word, two word, three word, etc., dictionaries to propose alternatives for various lengths of phrases. Thus, different lengths of text can be highlighted (e.g., reverse video, font style, font color, field background color). Proposed alternatives of different lengths can be presented in a single list, in lists of defined mixtures of lengths (e.g., two lists, one with phrases with three words or fewer and one with phrases of four words or more) or may appear in separate lists, each containing phrases of the same number of words.

In one embodiment, the proofreader can select among alternative words/phrases or perform other functions such as increasing or decreasing audio playback speed by using voice commands, tactile controls (e.g., computer-game joy sticks, including additional buttons, or other platforms), eye movements or blinks, foot pedals, muscle twitches, and other bionic inputs.

In addition to software mechanisms for improving the quality of the data input, the proofreader edits the data by taking note of highlighted sections and by reading the document in context to ensure consistency. In the event that the proofreader is not in a position to make a determination, one embodiment of the invention proposes the use of experts, such as oversight work stations, to make a final decision. In a situation where an oversight work station is not available or is also not in a position to make a final decision, the region of text in issue is marked and returned to the originating organization, namely, the user for appropriate selection or correction. This is indicated by Block 912. Thus, the proofreader or oversight work station or user may cause text to be corrected. As illustrated in Block 914, the corrected text is saved into the database or serialized document as discussed with reference to FIG. 2 above. The corrected structured or unstructured file, or only the portions that were changed, is then returned to the user in Block 916 and updates the text in the patient-encounter record. In the case of a structured document, positional or structural information is sent back with the data to permit the appropriate data locations on the user side, e.g., in the user database, to be corrected, and any changes in scoring, to be reflected on the user side.

Thus, the changes in the text may result in different information being put into the data entry locations. This may affect the scoring associated with such data. In one embodiment, it is contemplated that the user, upon receiving the returned data file, is again prompted for additional data input where the score for a certain section or for the entire document is within a predetermined desired point range. If the user is not inclined to make further changes once it is returned to him by the proofreader, he may, at least, take note of areas where he could have gained further points, for future data entry sessions.

The feedback from the proofreader in the form of the selection of particular options of text are also returned together with the audio snippets for purposes of retraining the speech recognition software, as is illustrated by Blocks 918 and 920. Final files or the changed portions thereof are returned to the user for replacing the original files or portions thereof (both continuous text output and individual structured elements in the database table as illustrated by Block 922.)

Figure 10:
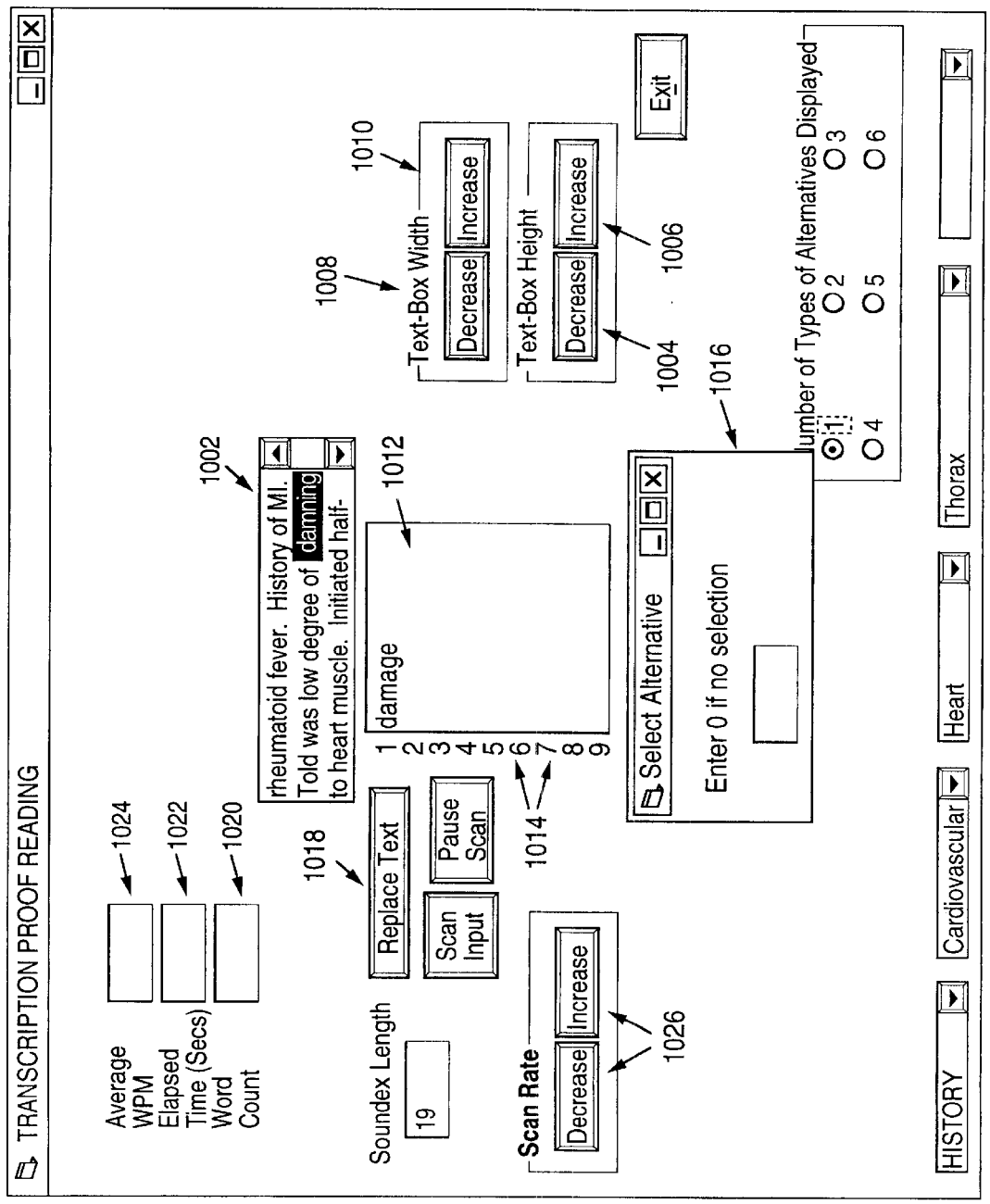
FIG. 10 shows a user interface for a proofreader.

An embodiment of the user interface for transcription proofreading is shown in FIG. 10. In this example, only one type of alternative is presented, that for the single word, but other display boxes displaying phrases of different lengths can easily by displayed. The text being proofread is displayed in text box 1002. Its height and width can be varied using controls 1004 and 1006 for height and 1008 and 1010 for width to adjust the display for individual proofreader preference. Each word or phrase of the text in 1002 can be highlighted, say the word "damning" to draw the attention to the proofreader to the current point of action. In a preferred embodiment the document has predefined regions having lexicons associated with the regions that are specific to the topic covered by the-region. The application alternatives are determined (at least in terms of priority of presentation) by the categories that the text being analyzed satisfies, if the text being analyzed has been so structured. The applicable alternative(s) at that point of text is displayed in a list box 1012 with the identification number(s) 1014 of the alternative(s) listed to its left. At each point where an alternative is to be considered, a dialogue box 1016 is presented in which the identification number of the desired selected alternative is input. A non-selection can be indicated by putting in a special number, say 0, or other character. Alternatively, the interface can be set up so the selections are made using a point-and-click mechanism. In addition, if that particular word (or phrase) is to be replaced by text not shown as an alternative or alternatives have not been presented, the appropriate button 1018 is pressed and a dialogue box brought up in which the replacement text can be input. In a preferred embodiment, as an aid to the proofreader, certain parameters are displayed such as the current word count 1020, the elapsed time 1022, and the current average words per minute 1024 for processed input already proofread. The proofreader may adjust the scan rate using buttons 1026.

Thus, the proofreader can select among alternative words/phrases or perform other functions such as increasing or decreasing audio playback speed. These selections may be made by using voice commands, tactile controls (e.g., computer-game joy sticks, including additional buttons, or other platforms), eye movements or blinks, foot pedals, muscle twitches, and other bionic inputs.

Figure 11:
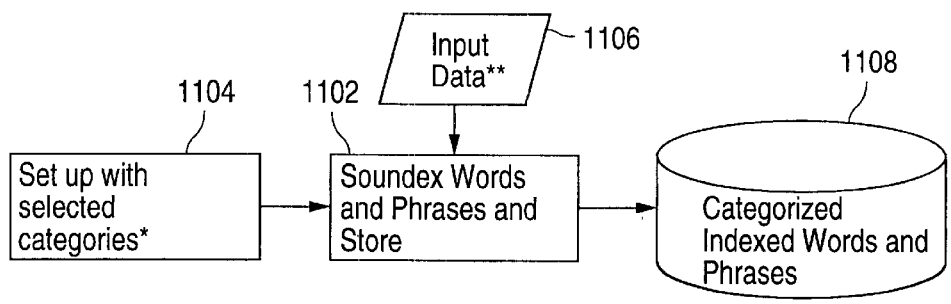
FIG. 11 is a schematic block diagram showing the use of Soundex codes in the invention.

As illustrated by FIG. 11, Soundex codes may be used to send phonetically similar codes as alternatives for selection by the user and/or the proofreader. Soundex words and phrases are stored as illustrated in Block 1102. These words emanate from predefined words categorized into certain categories. For example, the Soundex files may be categorized into,various section such as patient history, cardiovascular section, heart, thorax, and an unspecified section, as illustrated by Block 1104. The categories may be organized hierarchically so that selections can be made based on the desired scope. Data is input into the various categories as illustrated by Block 1106. Resultant categories with their data are then stored in a storage medium 1008. Alternatively, categorized voice-recognition segments may be used to generate and display text alternatives.

FIG. 12 illustrates a data base implementing the Soundex codes. Typical Soundex codes take the form of a letter followed by several numbers, e.g., five numbers, where the letter corresponds to the first letter of a word and the numbers depict the consonants in the word following the first letter. Consonants that sound the same such as "c" or "k" are given the same number, and double consonants, such as "ll" are treated as a single consonant. In order to take account of possible errors in the first letter, extended Soundex cards may be used. In Table 1200, depicted in FIG. 12, column 1202 shows extended Soundex codes made up of 19 numbers that represent the words or phrases in column 1204. Instead of retaining the first letter of the word they depict, these extended Soundex codes codify the first letter of the word in the same manner as the rest of the letters. As shown in 1202, codes represent the words or phrases and any unused portion of the 19 digits is filled with zeroes. As mentioned with respect to FIG. 11, the Soundex files of the preferred embodiment are categorized into various sections which are depicted in FIG. 12 by columns 1206, 1208, 1210, 1212, and 1214. Column 1216 shows an alternative implementation of Soundex codes corresponding to the words and phrases in column 1204.

The invention has been described with reference to an example involving a physician and patient. It will be appreciated that the invention is equally applicable to any data capture and proofreading environment not just medical. Furthermore, the reference to speech-recognition software is not to be seen as the only way in which data can be captured. Thus the system and method as defined by the claims of the invention is not to be read as limited to specific embodiments described in the specification.

What is claimed is:

1. A method of recording and evaluating data comprising:
   receiving data on a computer into at least one data entry location in a computer generated document having a pre-defined structure with defined data entry locations;
   allocating a point value to each data entry location based on the effort and skill involved in obtaining the data that is supplied to the data entry location, and
   performing mathematical manipulations on the point values to obtain a resultant number.

2. The method of claim 1, further comprising prompting a user for further data input to certain data entry locations based on the resultant number.

3. The method of claim 1 wherein the mathematical manipulations comprise adding the point values to obtain a total number of points.

4. The method of claim 1 wherein entering data on a computer includes voice input and the use of speech-recognition software to generate text data.

5. The method of claim 1 wherein the allocating of the point values and the performing of mathematical manipulations is performed by a computer.

6. The method of claim 5, further comprising comparing the resultant number to at least one predefined value and determining potential data entry locations for further data entry to achieve one of the at least one predefined value.

7. The method of claim 5 further comprising leading users through the document from one data entry location to the next by means of a visual prompt.

8. The method of claim 7, wherein the next data entry location is the next data entry location in the same row or column as the previous data entry location.

9. The method of claim 7, wherein the next data entry location is selected by the user.

10. The method of claim 7, wherein the next data entry location is selected by the computer based on a user data entry pattern determined from prior data entry activity.

11. The method of claim 7, wherein the visual prompt is moved to the next location once the user has indicated completion of data entry into the previous location.

12. The method of claim 7 wherein the visual prompt moves to the next location after a predefined time interval.

13. The method of claim 7 wherein the visual prompt moves to the next data entry location after a system determined time interval based on the user's prior data entry timing pattern.

14. The method of claim 4, wherein the entered data is compared to a dictionary of terms to identify potential errors.

15. The method of claim 14, wherein the entered data is compared to a dictionary of desired terms to determine which terms of the data entry fall outside the terms of the dictionary of desired terms.

16. The method of claim 14, wherein the method includes comparing the entered data to a dictionary of undesired terms that includes terms unlikely to be found in an area of interest to the user, for determining the terms of entered data likely to be incorrect.

17. The method of claim 15 which includes the step of indicating to the user whenever a term likely to be incorrect is detected in the entered data.

18. The method of claim 16, wherein the user is presented with alternative words or phrases from which to select, whenever a term likely to be incorrect is detected in the entered data.

19. The method of claim 14, wherein Soundex codes or extended Soundex codes are used to identify potentially incorrect data.

20. The method of claim 19, wherein the extended Soundex codes are used to identify potentially incorrectly transcribed words and phrases.

21. A method of claim 20, wherein alternatives are presented when potentially incorrectly transcribed data is identified.

22. A method of claim 14, wherein the document has predefined regions dealing with different categories of information, each region being associated with a dictionary tailored to said region.

23. The method of claim 22, wherein data is entered orally using speech-recognition software to transcribe the oral input, and wherein potentially incorrectly transcribed input is identified and alternatives are generated based on Soundex codes or speech-recognition segments.

24. The method of claim 4, wherein the data is stored as objects that include positional information.

25. The method of claim 24, wherein the data is stored in a database.

26. The method of claim 25, further comprising the step of proofreading the data entered into the document.

27. The method of claim 1, wherein the entering of data includes entering predefined data which is entered by downloading the predefined data from a memory location.

28. The method of claim 27, wherein the predefined data occupies more than one data entry location.

29. The method of claim 28, wherein the predefined data entry locations are each allocated at least one point.

30. The method of claim 1, wherein the number of data entry locations define the complexity of the document, and the complexity is selectable.

31. The method of claim 30, wherein the data is stored in a database having rows and columns, and wherein the complexity of the document chosen determines the number of rows pulled up for data entry.

32. The method of claim 31, wherein the data for each of the rows is allocated at least one point.

33. The method of claim 27, wherein the predefined data is entered by specifying a keyword associated with the data.

34. The method of claim 24, wherein the proofreading is done by a proofreader who is presented with a sound file of the oral data input, and a text file resulting from the conversion by the speech-recognition software.

35. The method of claim 34, wherein the sound file and the text file are synchronized with each other to facilitate moving forward or backward in either file and having the position in the other file automatically adjusted.

36. The method of claim 34, wherein the proofreader corrects mistakes in the text data and returns at least the corrected data and associated positional information to allow the stored data to be corrected.

37. The method of claim 36, wherein the returned data is used to teach the speech-recognition software.

38. The method of claim 34, wherein the entered data is compared to a dictionary of desired terms to determine which terms of the data entry fall outside the terms of the dictionary of desired terms, and wherein the proofreader is presented with a visual indicator indicating potentially incorrect terms and phrases in the text file.

39. The method of claim 38, wherein alternatives to the words and phrases that fall outside the terms of the dictionary of desired terms, are presented for selection.

40. The method of claim 38, wherein the entering of data includes entering predefined data which is entered by calling the predefined data from a memory location.

41. A method of claim 40, wherein the proofreader is presented with indicators defining the beginning and end of the predefined data.

42. The method of claim 40, wherein the user identifies the predefined data to be entered into the document, and marks the location where the data is to be inserted, and the data corresponding to the predefined data is inserted automatically by the computer or by the user or proofreader at any time thereafter.

43. The method of claim 1, further comprising the step of proofreading the data entered into the document, wherein a proofreader is presented with a sound file of the oral data input, and uses speech-recognition software to transcribe the oral data into text data, and uses the sound file to assist in proofreading the text data.

44. The method of claim 43, wherein the proofreader uses more powerful sound recognition software to more accurately transcribe the oral data input.

45. A method of doing business comprising:
   providing users with an electronic data entry facility that includes a user interface defining a data entry document for data entry on a computer, wherein the document has pre-defined data entry locations with a predefined value associated with each of the data entry locations; and
   mathematically manipulating the values to arrive at least at one accumulated point total for use in a subsequent decision making process.

46. The method of claim 45, wherein data. is entered using oral commands and speech-recognition software.

47. The method of claim 46, further comprising providing a proofreading facility to verify and edit the data input.

48. The method of claim 47, wherein a proofreading facility is located at a different geographical location to the user and is linked to the user by means of a network.

49. The method of claim 45, wherein the mathematical manipulation comprises adding the points for predefined data entry locations of the document or for the entire document.

50. The method of claim 45, wherein the accumulated points are transmitted by means of a computer network to a third party.

51. A method of verifying the accuracy of orally recorded data, comprises:

saving oral input into an audio file;

transcribing the oral input data into text data and saving the text data in a text file;

synchronizing the sound file and text file;

comparing at least a term or a phrase of at least the oral input data or the text data to at least a pre-defined term or phrase; and indicating terms or phrases that are potentially incorrect, wherein the step of comparing includes comparing the term or phrase to at least a dictionary of desired terms and a dictionary of undesired terms, wherein the dictionary of desired terms includes at least a term or phrase likely to be found in a field of use of the orally recorded data, and the dictionary of undesired terms includes at least a term or phrase not likely to be found in the field of use of the orally recorded data.

52. The method of claim 51, wherein the step of indicating terms or phrases includes a visual or oral indicator.

53. The method of claim 51, wherein the step of synchronizing involves using tags in the sound and text files.

54. A system for recording data comprising:

with defined software for generating an electronic document having a pre-defined structure with defined data entry locations, and means for entering data into the data entry locations;

wherein each of the data entry locations has a point value associated with it, the system further comprising means for performing mathematical manipulations on the point values to obtain a resultant number.

55. The method of claim 6, wherein determining potential data entry locations for further data entry includes the computer providing at least one visual depiction of the data entry locations that have data in them and the points associated with such data entry locations, and all or selected data entry locations or groups of data entry locations that do not have data in them but if filled with data would provide the opportunity for scoring additional points.

56. The method of claim 55, wherein the at least one visual depiction is a tree structure.

57. The method of claim 55, wherein a plurality of visual depictions are provided by the computer and a user can select from the depictions.

58. The method of claim 57, wherein the visual depictions show different amounts of detail.

59. The method of claim 55, wherein the computer selects which data entry locations or groups of data entry locations without data, to depict, based on predetermined score threshold levels and a determination of those data entry locations or groups of data entry locations that are most likely to lead to the next higher score threshold level.

60. A method of verifying the accuracy of orally recording data that is recorded for entry into a document having a plurality of fields dealing with different subject matters, comprising saving oral input into an audio file;

transcribing the oral input data into text data and saving the text data in a text file;

synchronizing the sound file and text file;

comparing each word or phrase to predefined words or phrases in a dictionary that is specific to the field.

61. The method of claim 60, wherein each field is associated with a dictionary of desired terms and a dictionary of undesired terms.

62. A method of claim 51, wherein at least one of the dictionaries includes multiple word phrases.

63. A method of claim 60, wherein at least one of the dictionaries includes multiple word phrases.

* * * * *